United States Patent [19]

Crase et al.

[11] 4,220,380

[45] Sep. 2, 1980

[54] BEARING ASSEMBLY

[75] Inventors: Gary M. Crase, Cypress; Kurt H. Trezeciak, Fountain Valley; John E. Tschirky, Long Beach, all of Calif.

[73] Assignee: Smith International Inc., Newport Beach, Calif.

[21] Appl. No.: 3,783

[22] Filed: Jan. 15, 1979

[51] Int. Cl.³ ............................................. F16C 19/14
[52] U.S. Cl. .................................... 308/174; 175/107; 308/227; 415/170 R
[58] Field of Search ..................... 175/107, 371; 308/8, 308/8.2, 174, 189 R, 189 A, 207 A, 219, 227, 244; 415/170 R

[56] References Cited

U.S. PATENT DOCUMENTS

| 3,936,247 | 2/1976 | Tschirky et al. | 175/107 X |
| 4,029,368 | 6/1977 | Tschirky et al. | 175/371 |

*Primary Examiner*—Frederick R. Schmidt

*Attorney, Agent, or Firm*—Philip Subkow; Bernard Kriegel

[57] ABSTRACT

A fluid lubricated bearing assembly for use with an in-hole fluid motor has a housing and a shaft supported in the housing by a plurality of stacked adjustable bearings, through which thrust is transmitted to the shaft from a single thrust transfer point in the housing. The thrust bearings are individually adjustable to eliminate tolerance and thrust elements transfer load from the housing to the bearings from the single thrust transfer point. In the preferred form, the thrust elements include a flow restrictor sleeve in thrust transmission relation with bearings at opposite sides thereof. The flow restrictor sleeve cooperates with a companion flow restrictor sleeve on the shaft to limit the flow of fluid through the bearings from the motor. Radial contact bearings at opposite ends of the flow restrictor support the flow restrictor sleeves to minimize wear and resist bending forces applied radially of the sleeves.

24 Claims, 10 Drawing Figures

BEARING ASSEMBLY

BACKGROUND OF THE INVENTION

In the use of in-hole, drilling fluid driven motors to drive a drill bit, in well bore drilling, mining, or other earth drilling operations, the bit is mounted on a bearing shaft, supported in a bearing housing.

Examples of prior art patents are:

Tschirky and Crase; U.S. Pat. No. 4,029,368; June 15, 1977

Tschirky and Crase; U.S. Pat. No. 3,936,247; Feb. 3, 1976

Tschirky and Geczy; U.S. Pat. No. 3,982,859; Sept. 28, 1976

In the first two listed patents, the bearings are lubricated or cooled by a portion of the drilling fluid flowing between the shaft and the bearing housing. In the last mentioned patent, the bearing housing is sealed and contains a lubricant.

In either type of structure, the differential drilling fluid pressure across the bearing assembly is a function of the flow of drilling fluid through restricted nozzles in the bit. Flow restricting means are generally employed in drilling fluid lubricated bearings to restrict the by-pass of fluid through the bearing assembly to a relatively small percentage of the total flow, so as to maintain the fluid flow through the bit nozzles at a sufficient rate to effectively remove cuttings and cool the bit cutters. If the bearings or flow restrictor means wear excessively, the drill pipe string, motor and drill may be round tripped to enable repair of the bearing assembly in an uneconomically short period of drilling time, when the bit is still in satisfactory condition for further drilling.

A major problem in the use of such in-hole motors has long been the wear in the bearing assembly through which load is transferred from the housing to the drive shaft and to the bit, during drilling operations, particularly when the bearings are lubricated by the erosive drilling fluid. Thus, for a number of years, prior to this application, efforts have been made by us, and our Assignee, to develop and satisfactorily operate, under actual bore hole drilling conditions, a bearing assembly which can be readily assembled and which is durable for an economic period in the drilling of bore holes in the presence of the hostile loading and abrasive environment.

In early attempts at the use of adjustable bearings, a number of bore holes were drilled with bearing assemblies which included plural thrust bearings individually adjustable with respect to plural shoulders in the housing, in an effort to equally distribute load between the plural thrust bearings, while restricting drilling fluid flow through the bearing assembly by marine type bearings and wear resistant radial contact bearings. However, for various reasons, such bearing assemblies were not found to be satisfactory.

Later, a bearing assembly in an in-hole motor was experimentally run wherein all of the adjustable thrust bearings were adjusted on the shaft with respect to a single thrust shoulder in the housing, and the flow restrictor sleeves were located between the housing and the shaft below the lowest thrust bearing.

Later in an effort to determine the best mode of restricting drilling fluid flow through the assembly, various tools are constructed wherein the housing was formed in two sections, adapted to be threaded together, in order to enable the installation of various flow restrictor devices. Different types of flow restrictors were employed, such as those more particularly described in Tschirky and Crase; U.S. Pat. No. 4,029,369, and in the pending application of Crase; Ser. No. 914,271; filed June 9, 1978, in so far as the arrangement of bearings and flow restrictors is concerned.

The problem of elimination of the bearing damage caused by the clearance which is built into the bearing assembly under alternate loading and unloading, is addressed in the above-identified pending application, Ser. No. 914,271.

Various forms of locking devices for securing the adjustable bearings and other components on the shaft have been employed, including typical lock nut structures and other locking devices whereby the adjustable bearing race was durably locked to the shaft, and various devices were found to be more or less satisfactory. The application of Crase, filed concurrently herewith, Ser. No. 003,004; filed Jan. 12, 1979 discloses and claims the eccentric locking means determined to be the best mode for simply and effectively adjusting the bearings.

SUMMARY OF THE INVENTION

The present invention relates to bearing assemblies of the fluid lubricated type referred to above.

More specifically, the present invention involves the arranging of thrust bearings of such an assembly in a manner enabling their adjustment with respect to a single shoulder in the housing, whereby all thrust is transmitted from a single transfer point to all of the bearings.

The arrangement of a flow restrictor between the bearings in such a manner as to enhance the effective, working life of the bearing assembly and the flow restrictor.

In accomplishing the foregoing, the structure more specifically is one wherein thrust is transferred from a single thrust shoulder in the housing to plural, adjustable stacked bearings, and wherein the flow restrictor means are situated between the thrust bearings, so as to be better supported and wherein the thrust is transferred from a bearing above the flow restrictor to a bearing below the flow restrictor, through the flow restrictor. More specifically, the flow restrictor sleeve within the housing constitutes a thrust transfer element, but other structures are possible whereby the thrust is transferred past the flow restrictor means, and wherein the housing which encases all of the bearings and the flow restrictor means, extending axially from the single thrust shoulder, is nothing more than a cover, and no thrust is transmitted through the housing.

Since flow restrictor devices involving a pair of relatively rotating cylindrical surfaces, say on a pair of coaxial sleeves in the housing and on the shaft, are capable of maintaining a substantially constant pressure drop and flow, in the presence of a given differential pressure, only so long as interfacial wear of the surfaces is prevented. Upon frictional contact and loading of the sleeves, wear is quite rapid, due to the abrasive nature of the drilling fluid, even though the flow restrictors may be made of wear or abrasion resistant materials.

Accordingly, in the case of the present invention, the flow restrictor sleeves in the bearing assembly provide a restricted flow path of sufficient length to effectively limit the volume of flow through the bearings to the desired amount, but the bearing construction is such that the flow restrictor is properly located and supported against radial loading, so as to be operative for an economic period of time, without requiring removal of the bearing assembly for repair.

In addition, the bearing construction is such that over a range of wear, during use, the bearings are maintained under spring loaded contact during reversals of thrust direction, when certain bearings are not otherwise loaded. In this connection, the bearing assembly includes stacked bearing sets, which are herein characterized as "set down" bearings, and which transmit thrust to the shaft from the housing to apply drilling thrust to the rotating bit. On the other hand, in the course of drilling operations, it is common practice to sometimes back the bit off bottom of the bore hole and continue the circulation, at which time the thrust from the shaft, due to the pressure of drilling fluid acting thereon is transmitted to the housing through other bearings, which are herein characterized as "pick up" bearings. As these reversals of thrust occur the pick up and set down bearings are alternately loaded and unloaded. In the case of the present invention, the bearings are spring loaded over a range of wear to prevent free play in the unloaded bearings, to minimize damage resulting from violent impact of the bearing components.

In the present bearing assembly, the flow restrictor means is formed by plural, axially spaced flow restricting structures located and arranged to minimize wear due to contact, while providing the desired length of restricted flow path. One flow restricting structure is located adjacent to the point of entry of drilling fluid between the shaft and housing. This flow restrictor, being of wear resistant material serves to reduce, by a grinding action, the size of abrasive particles. Concentricity of this flow restricting structure is maintained by the pick up bearings. A second flow restricting structure is located between the ends of the assembly and between axially spaced sets of adjustable set down bearings to maintain concentricity of the flow restricting sleeves over the range of adjustment of the set down bearings. These two flow restricting structures are the primary flow restricting means between the shaft and the housing.

A secondary flow restrictor is disposed between the two flow restrictor structures referred to above, and located at a joint between housing sections, where the shaft would otherwise have a substantial axial section unsupported in the housing. This secondary flow restrictor provides a flow path area which may be slightly larger than the flow area of the primary flow restrictors, and it is operative only after the primary flow restrictors are inevitably worn or abraded to a large extent, due to progressive bearing wear, without adjustment, during one drilling operation, when the tool remains in the hole and cannot be adjusted. This secondary flow restrictor also can effectively act as a radial bearing, in order to minimize radial movement of the shaft section therein.

BRIEF DESCRIPTION OF THE DRAWINGS

FIGS. 2a, 2b, and 2c, together, constitute an enlarged longitudinal section, as taken on the line 2—2 of FIG. 1, FIGS. 2b and 2c being successive downward continuations of FIG. 2a;

FIG. 7 is a view corresponding with FIG. 6, but showing the adjusted bearing supporting the shaft; and FIG. 8 is a view corresponding with FIG. 6, but showing the bearing in condition during drilling with the drill of FIG. 1.

DESCRIPTION OF THE PREFERRED EMBODIMENT

Figure 1:
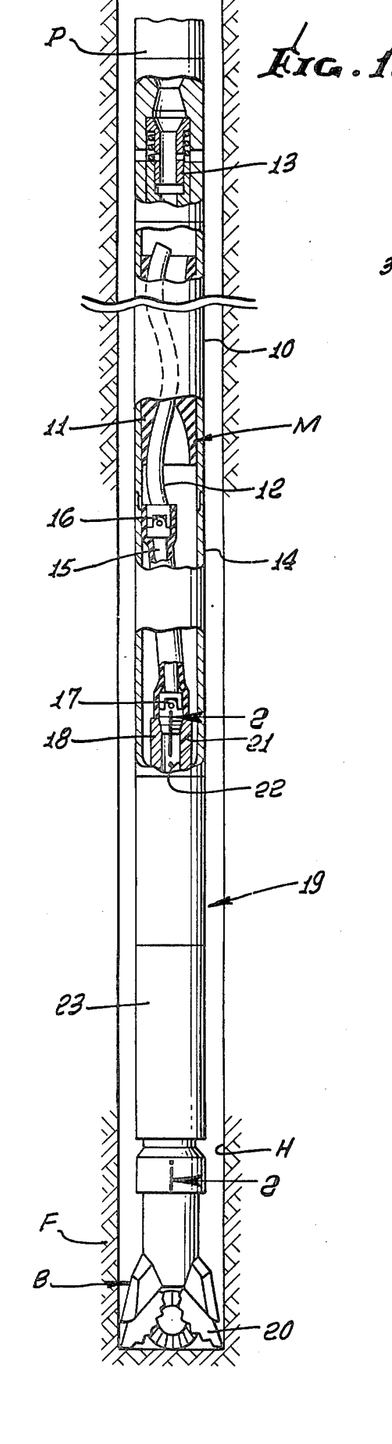
FIG. 1 is a view diagrammatically showing an in-hole motor drill, partly in elevation and partly in section, in an earth bore hole and incorporating a bearing assembly in accordance with the invention.

As seen in the drawings, referring first to FIG. 1, an in-hole motor assembly M is connected to the lower end of a string of drilling fluid conducting drill pipe P and has its housing 10 providing a stator 11 for a rotatable, helicoidal rotor 12. The rotor is driven by the downward flow of drilling fluid from the pipestring through the usual dump valve 13, the fluid passing downwardly through a connecting rod housing section 14 which contains a connecting rod assembly 15, connected by a universal joint 16 to the lower end of the rotor 12 and by a universal joint 17 to the upper end of a drive shaft 18. The drive shaft extends downwardly through a bearing assembly 19, and at its lower end the drive shaft is connected to a drill bit B having cutters 20 adapted to drill through the earth formation F in the drilling of a bore hole H. The drife shaft 18 is tubular and has adjacent its upper end inlet ports 21, through which the drilling fluid passes from the connecting rod housing 14 into the elongated central bore 22 of the drive shaft, the fluid exiting from the bit B to flush cuttings from the bore hole and cool the bit.

Figure 2A:
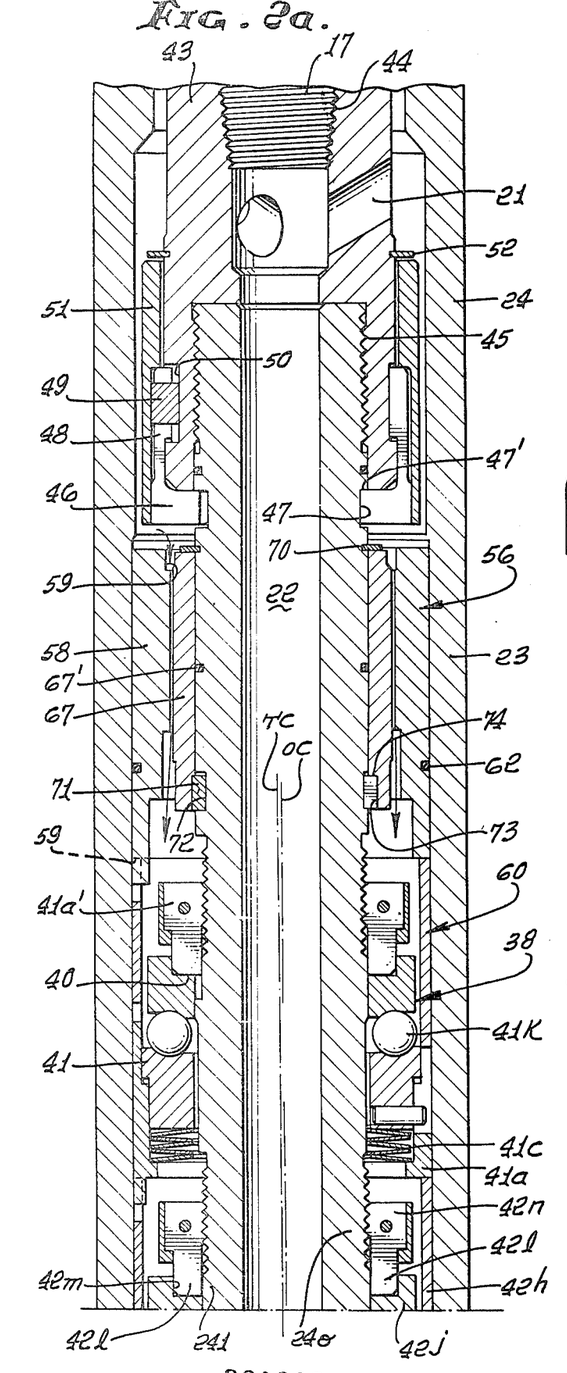
Figures 2B, 7:
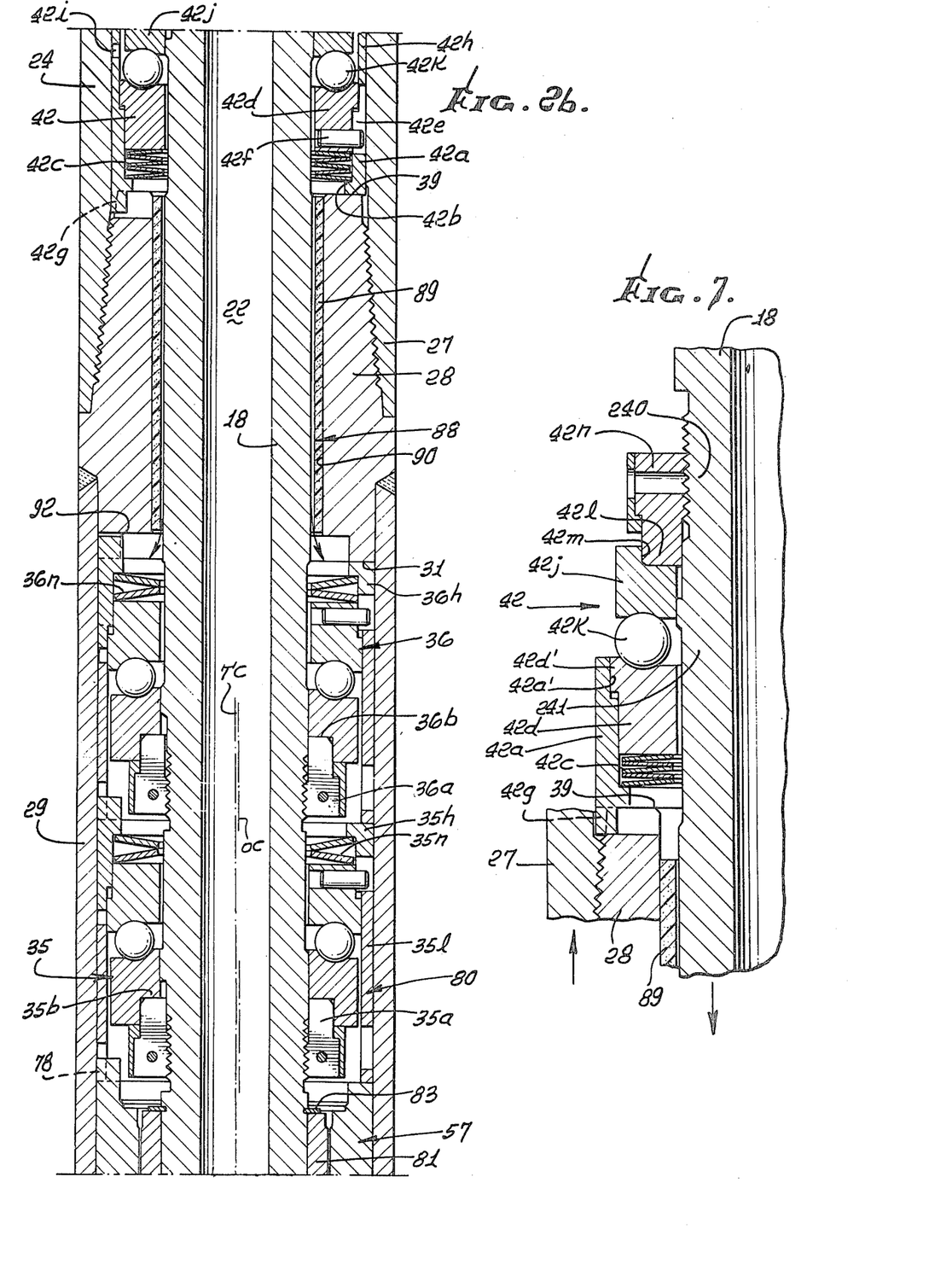
Figures 2C, 8:
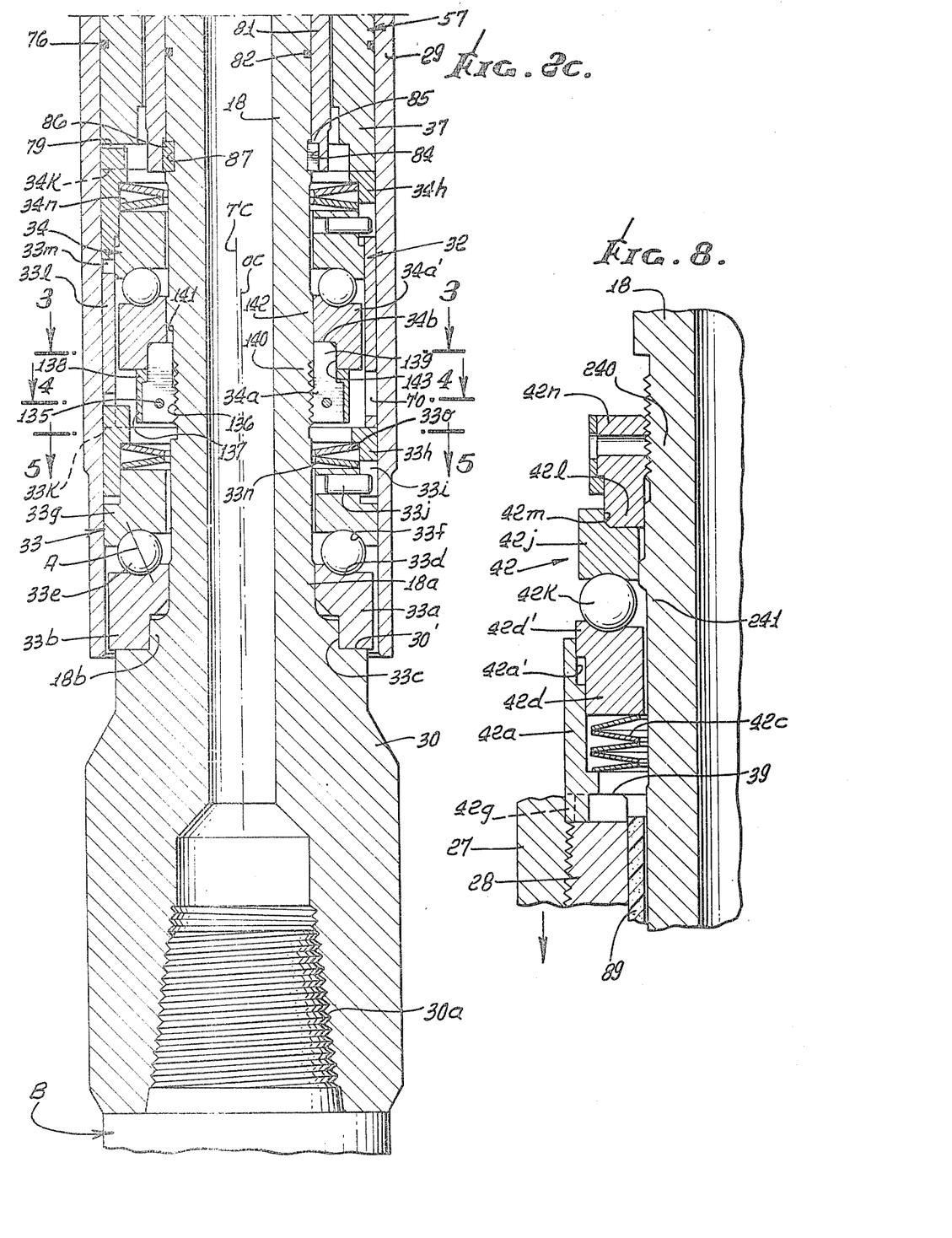
Figure 3:
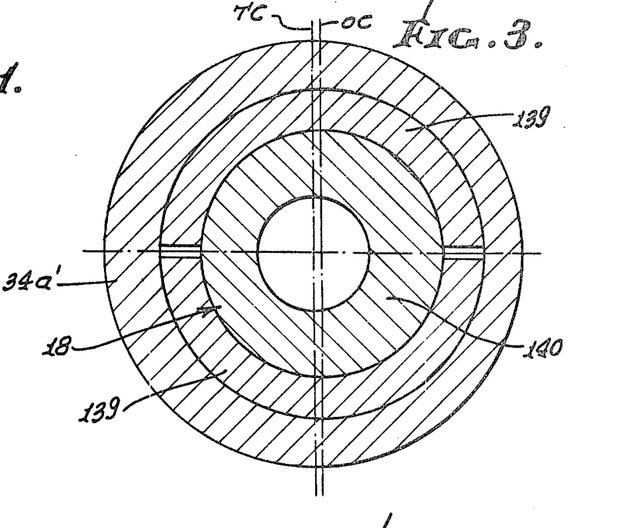
FIG. 3 is a transverse section as taken on the line 3—3 of FIG. 2c.
Figure 4:
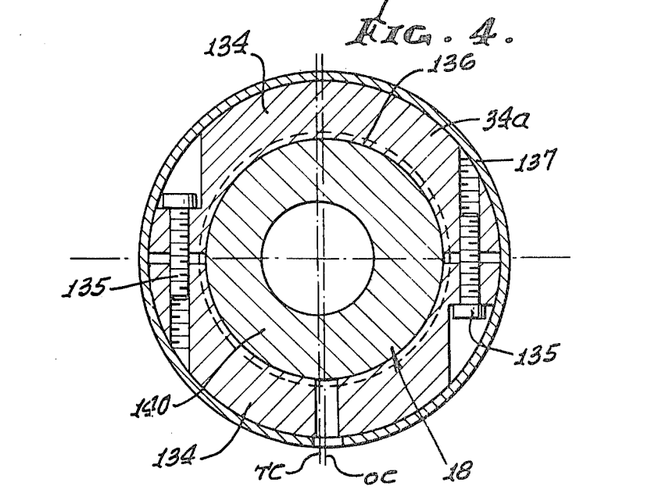
FIG. 4 is a transverse section as taken on the line 4—4 of FIG. 2c.
Figure 5:
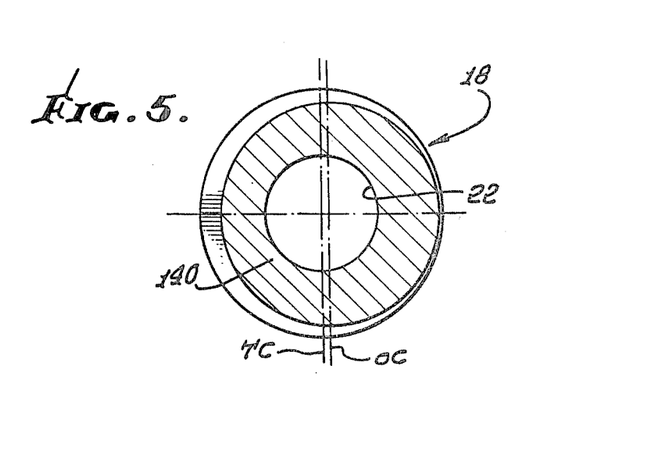
FIG. 5 is a transverse section through the shaft, as taken on the line 5—5 of FIG. 2c.

During operation of the fluid motor M, the lower end of the rotor 12 has an eccentric motion which is transmitted to the drive shaft 18 by the universal connecting rod assembly 15, and the drive shaft 18 revolves about a fixed axis within the outer housing structure 23 of the bearing assembly 19, the drive shaft being supported within the housing, in accordance with the present invention, by the stacked adjustable bearing means, more particularly illustrated in FIGS. 2a through 2c. The cutters 20 of the bit B drill through the earth formation, in the drilling of the bore hole, at a rate determined by the speed of rotation of the drive shaft 18 and the axial force or weight applied to the cutters through the intermediary of the bearing housing. In the case of certain earth formations such as hard rock, the axial loading or force applied to the bit cutters is substantial, and therefore, the bearing means within the bearing assembly 19, through which the axial load is transferred from the housing 23 to the drive shaft 18 are subjected to severe axial loading, as well as to severe vibration and shock loading as the drill bit revolves on the bottom of the bore hole. In addition, the bearing means are subjected to severe radial loading, due to the high longitudinal force applied to the drive shaft, and, as is well known, the bearing assemblies utilized in connection with the motor drills, such as that shown in FIG. 1, must, therefore, be very durable. Since multiple radial and thrust bearings are generally employed between such a bearing housing and drive shaft, it is difficult, and as a practical matter impossible, to provide a stacked bearing sub-assembly including shock absorbing spring elements, without tolerances if the sub-assemblies are installed between thrust transmitting shoulders of fixed spacing. This is due to the fact that the components of the various bearing sub-assemblies, even though fairly precision made, nevertheless have manufacturing tolerances which cumulatively result in unequal loading of the bearings, unequal action of the springs, and excessive wear and heat of friction in the case of the overloaded bearings and overworked springs. When it becomes necessary to service a bearing assembly, to replace, at least, the excessively worn and/or the excessively overworked springs, with new bearings or new springs, the cumulative tolerance problem is further aggravated and in some instances it may even be necessary to replace the totality of the bearing sub-assemblies and springs to minimize the tolerance problem. In addition, such bearings include pick-up bearings which take the thrust of the shaft when the bit is at bottom of the hole and fluid is circulated.

In the present invention there are means which make it possible to substantially eliminate all tolerance in each of the bearing sub-assemblies or units and in each of the cushioning spring sections of the respective bearing units, and, thereby, eliminate, not only the tolerance in each sub-assembly, but also the possibility of cumulative tolerance. In addition, the bearing sub-assemblies being individually adjustable to eliminate tolerance therein, any worn components in any of the individual bearing sub-assemblies can be replaced with new components, and the resultant tolerances eliminated. These adjustable bearings are specifically the subject of the application Ser. No. 003,004; filed Jan. 12, 1979, identified above.

Referring to FIG. 2a, it will be seen that the bearing housing structure 23 includes an elongated tubular upper housing section 24, which is broken away, but which, as well known, extends upwardly and is connected to the connecting rod housing 14. As seen in FIG. 2b, the lower internally threaded end 27 of the upper housing section 24 is connected to the externally threaded upper end 28 of a lower, downwardly extending bearing housing section 29. The drive shaft 18 extends longitudinally through the housing assembly and has, as seen in FIG. 2c, a lower end 30 projecting from the lower end of the housing. This lower end 30 of the drive shaft is adapted to be connected to the bit B in the usual manner by a pin and box connection 30a. On the enlarged lower end of the drive shaft is an upwardly facing shoulder 30' which is axially opposed by a downwardly facing internal shoulder 31 provided within the lower housing section 29, as will be later described. Located between the opposed shoulders 30' and 31 within the annular space defined between the drive shaft and the inside of the housing are lower radial and thrust bearing or set down means 32 adapted to transmit axial load or weight from the shoulder 31 to the shoulder 30' in the operation of the motor drill of FIG. 1.

As shown, the bearing means 32 includes a number of axially spaced, spring cushioned, radial and thrust bearing sub-assemblies 33, 34, 35 and 36, respectively, disposed between the shaft 18 and the housing 29 in progressively upwardly spaced relation from the lower thrust shoulder 30' to the upper thrust shoulder 31. The bearings 33 and 34 are below a thrust sleeve 37 forming part of a flow restrictor, later to be described, and the bearings 35 and 36 are spaced above the thrust sleeve 37.

Upper, pick up bearing means 38 between an upwardly facing shoulder 39 (FIG. 2b), provided by the pin end 28 of the lower housing section, and a downwardly facing shoulder 40 (FIG. 2a), are provided by an upper bearing sub-assembly 41 which cooperates with a lower bearing sub-assembly 42, above shoulder 39, to transmit thrust to the housing shoulder 39 from the shaft 18 when the housing is elevated to lift the bit off the bottom of the hole. Such downward thrust may be substantial, depending upon the differential pressure across the usual bit orifices acting to thrust the shaft downwardly in the housing.

Referring to FIG. 2a, the connection between the drive shaft 18 and the universal joint 17 is shown. A cap 43 is threadedly connected at 44 with the connecting rod assembly and is threaded onto the shaft at 45. This cap has the ports 21 therein enabling fluid flow from the connecting rod housing into the hollow shaft passage 22. A split lock ring 46 fits in a groove 47 in the shaft and has longitudinal keyways 48 for receiving one or more locking keys 49 which also engage in a keyway 50 in the shaft. A retainer sleeve 51 fits about the cap and the locking ring to retain the key or keys 49 in place. A snap ring installed on the shaft holds the retainer in place. Rotation of the locking ring 46 is prevented when keyed to the cap, so that the cap cannot back off at its threaded connection with the shaft, by forming the groove 47 eccentrically with respect to the axis of the shaft, as indicated by the true center line TC of the shaft and the offset center OC of the groove.

The stacked bearing assembly of the present invention is one wherein a quantity of the drilling fluid flows through the assembly from the connecting rod housing 14, due to the differential pressure between the drilling fluid within the connecting rod housing and the drilling fluid in the bore hole H. This differential pressure is, ignoring dynamic and hydrostatic pressure differences, the difference caused by the restriction to the flow of fluid through the usual bit orifices. As herein illustrated, the upper end of the upper bearing housing 24 houses the upper flow restrictor means 56, and between the bearings 35 and 34 of the lower bearing means 32 is a further flow restrictor means 57.

The flow restrictor means 56 comprises an outer wear resistant sleeve 58 disposed in the housing and having notches 59 at its lower end engaged with thrust means 60 of the upper bearing means 38, to be later described, so as to be held against rotation therein. A suitable O-ring seal 62 is disposed between the sleeve 58 and the body to prevent fluid flow therebetween. Revolvable with the shaft 18, within the wear resistant sleeve 58, is a wear resistant sleeve 67 which is sealed at 67' and retained in place by a snap ring 70. These sleeves 58 and 67 define an annular, restricted flow path between their mutually confronting, cylindrical surfaces. Additional flow may be permitted by providing one or more grooves or paths between wear resistant members in the sleeves.

In order to cause rotation of the flow restrictor sleeve 67 with the shaft 18, a split ring 71 is disposed in a groove 72 in the shaft formed eccentrically to the center of the shaft on the offset center OC, and the lower end of the sleeve 67 has an eccentric bore 73 forming a shoulder 74 which seats on the ring 73. Thus, the sleeve 67 is locked on the shaft, due to the eccentricity of the lower support means and the concentricity of the body of the sleeve with the shaft above the shoulder 74.

The lower flow restrictor means 57 (FIGS. 2b and 2c) is similar in construction to the upper flow restrictor means 56 and includes the outer thrust sleeve 37, previously referred to, sealed at 76 in the housing 29 and held against rotation by the provision of notches 78, at the upper end, and notches 79, at the lower end, engaged with thrust means 80, later to be described. Mounted on the drive shaft is an inner wear resistant sleeve 81, sealed at 82, and rotatable with the shaft. At the upper end of the sleeve 81 is a retainer ring 83, and, at its lower end, the sleeve has an eccentric bore 84 forming a shoulder 85 which seats on a split ring 86 in the eccentric groove 87 in the shaft. This groove 87 is formed on the offset center OC, and the eccentric seat of the sleeve on the ring forms a lock with the upwardly extended sleeve body which is on a section of the shaft formed on the true center TC. These sleeves form between their mutually confronting cylindrical surfaces, an annular restricted flow path which combines with that between sleeves 58 and 67 to provide primary flow restriction.

There is a third or intermediate flow restricting means 88, providing secondary flow restriction. This flow restricting means is an elongated sleeve 89 disposed in the bore 90 within the pin end 28 of the lower housing 29 and bonded or otherwise retained in place. Between the shaft and the sleeve 89 is clearance space for the restricted flow of motor or drilling fluid. This secondary restriction is no smaller than the primary flow restriction. The sleeve 89 may be in the nature of a slotted radial bearing affording radial support for the shaft, either initially or after some wear in the main bearings.

Due to the differential pressure of fluid in the connecting rod housing entering the drive shaft 18 and in the annular space externally of the housing in a bore hole, a certain amount of the drilling fluid will be caused to flow between the upper flow restrictor members, which reduce, by abrasion, the size of particles in the fluid into the bearing assembly and through the intermediate and lower flow restrictor members from the bearing assembly, affording a certain amount of lubrication and a cooling effect upon the bearing parts. Since the drilling fluid is quite erosive, the flow restrictor rings are adapted to resist wear by utilization of wear resistant materials such as tungsten carbide or alumina, as more specifically described in U.S. Pat. No. 4,029,368.

In the present invention the various bearing sub-assemblies can be individually adjusted to eliminate tolerances, to enhance the longevity of the assembly in the hostile environment of drilling fluid or in some other environment wherein tolerances need adjustment.

Referring to the lower bearing means 32, it will be seen that each bearing sub-assembly 34, 35 and 36 has an adjuster nut 34a, 35a and 36a, respectively, hereinafter to be described in detail, but each nut having a shoulder 34b, 35b and 36b, respectively, to which thrust is transmitted from the housing to the shaft, say, during drilling. These thrust shoulders, functionally, correspond with the upwardly facing shoulder 30' at the lower end of the shaft.

This shoulder 30' takes the thrust transmitted through the lowermost bearing 33. Bearing 33 has a lower, annular race 33a, which fits on a shaft section 18a concentric with the true center TC of the shaft. A skirt 33b on the race 33 fits on a section 18b of the shaft and abuts with the shaft shoulder 30'. The shaft section 18b is circular, but formed on the offset center OC, so as to be eccentric with respect to the true center, and the inner wall 33c of the skirt 33b is correspondingly eccentric to the true center, since it is formed on the offset center. Thus, the lower race 33a is non-rotatable on the shaft.

A raceway 33d in the race 33a receives bearing balls 33e which also engage in an upper raceway 33f of the upper bearing race 33g which closely fits within the housing. As is clearly seen, the bearing raceways are formed for angular contact with the balls, see angle A, so that the bearing transmits thrust and radial load to hold the shaft centrally of the housing.

Means are provided to lock the upper race 33g to the housing, including an adaptor sleeve or ring 33h which fits in the housing and has longitudinally extended slots 33i receiving pins or keys 33j spaced about the race 33g. At its upper end, the locking adaptor has notches and lugs at 33k which interfit with companion notches and lugs at the lower end of a spacer sleeve 33l which extends upwardly in the housing. At its upper end, the spacer sleeve has a notched and lug interfit at 33m with a locking adaptor ring or sleeve 34h of the bearing 34, which, in turn, has a notched and lug interfit at 34k with the sleeve 37 of the flow restrictor means 57. At its upper end, the sleeve 37 has a notched and lug interfit with a spacer sleeve 35l of the bearing 35.

Without requiring further specific description of each bearing sub-assembly 34, 35 and 36, it will be seen that they all correspond, and that the interfit between the respective locking adaptors and spacer sleeves extends upwardly to the shoulder 31, so that downward thrust is transmitted through the thrust means 80 to each of the bearing sub-assemblies 33, 34, 35 and 36, and from each locking adaptor 33h, 34h, 35h and 36h to the respective upper bearing races.

In each bearing 33 through 36, spring means are provided to cushion the vibrations caused by rotation of the bit on the bottom of the hole. As seen in the bearing 33, a pair of opposed Bellville springs or cupped spring washers 33n are disposed in opposite relation between the upper bearing race 33g and a downwardly facing shoulder 33o provided internally of the locking adaptor 33h. Under drilling conditions, the weight or axial thrust applied to the bit through the bearing assembly is transmitted through the spring washers, and each bearing sub-assembly has its spring washers 33n, 34n, 35n and 36n compressively loaded. The washers have a substantially constant spring rate and can be selected to cushion the axial thrust without being fully flattened, so as to maintain resilience in the bearing system.

In order to properly or equally distribute the thrust across the several bearing 35 through 36, while drilling, it is necessary that the tolerance in each sub-assembly be adjusted, even when the bearings are new, but particularly after some wear has occurred, and such wear may not be the same in each bearing sub-assembly. Adjustment also establishes and maintains the flow area or gap between the flow restrictor sleeves. Thus, adjustable nuts 34a through 36a are provided and individually adjustable.

Bearing sub-assembly 34 is exemplary and is illustrated in FIGS. 2c, 3, 4 and 5. The nut 34a is formed as nearly half sections 134 of a full circular nut, the sections being secured together by screw fasteners 135, so as to clamp on the thread 136 on the shaft in a selected, adjusted position. A retainer ring 137 is also disposed about the nut and has a top flange 138 seating on the nut. A neck 139 extends upwardly on the nut. The thread 136 is formed on a section 140 of the shaft which is circular about the offset center OC of the shaft, and the neck internally engages an eccentric cylindrical section 141 of the shaft. The bearing race 34a' is disposed about a section 142 of the shaft which is cylindrical about the true center TC and has a bore providing an inner cylindrical wall 143 which is cylindrical about the true center TC and engages about the outer wall of the neck 139 which is cylindrical about the offset center OC. Thus, the eccentric portions of the nut and race combine with the concentric portions of the race and shaft to lock the race to the shaft for unitary rotation, but the axial position of the nut can be threadedly adjusted to adjust the position of the races, balls and springs of the bearing sub-assembly so that all clearance is taken up and all parts are in contact over the full range of manufacturing tolerances, as well as wear during use of the assembly. Each bearing can, therefore, be independently adjusted relative to locking adaptor ring 34h, 35h and 36h, to all of which thrust is transmitted through the thrust transmitting means 80, from the shoulder 31 in the housing to the shoulder 30' on the lower end of the shaft.

As seen in FIGS. 2a and 2b, the upper bearing or pick up bearing means can also be adjusted between the upwardly facing shoulder 39 on the housing and the downwardly facing shoulder 40 on the shaft. This latter shoulder is provided on an adjustor nut 41a' of the uppermost bearing sub-assembly 41.

As seen in FIG. 2b, an upper locking adaptor ring or sleeve 42a seats on the housing shoulder 39 and has an internal shoulder 42b for a stack of Bellville springs or washers 42c on which the lower bearing race 42d seats. The locking adaptor is slotted longitudinally at 42e to receive pins 42f carried by the race, and the adaptor has notches and lugs at 42g interlocked with companion lugs on the housing pin 28, so that it is locked to the housing against rotation, but can move longitudinally. A spacer sleeve 42h has lugs and notches 42i coengaged with the locking adaptor 42a, at its upper end and extending upwardly in the housing to form a seat (FIG. 2a for the locking adaptor 41a of the upper bearing 41. The bearing 42d and the companion race 42j have annular raceways formed for angular contact with the bearing balls 42k to transmit thrust and radial loads. Concentricity of the upper flow restricting sleeves is established and maintained by adjustment of these upper or pick up bearings.

To lock the upper race 42j to the shaft, while enabling adjustment, a split nut 42n, like the previously described adjustor nuts, is threaded and clamped on the eccentric section 24o of the shaft and has a skirt 42l engaging within the eccentric bore 42m of the race 42j to lock the race to the shaft, due to the fit of the race 42j on the concentric section 241 of the shaft. Without requiring further specific description, it is apparent that the uppermost bearing 41 is constructed and adjustable in the same manner as bearing 42, and that when the housing is lifted to lift the bit off the bottom of the hole, the thrust of the shaft is transferred through the bearing 41 and 42.

The cushioning springs 42c and 41c of the upper bearings or pick up bearing are adapted to be adjusted or preloaded in a manner which tends to preload the springs of the lower or set down bearings. In addition, the structure is such that when the device is operating to drill, and the pick up bearing are not otherwise loaded, the motion which occurs as the set down cushioning springs 33n through 36n are partially compressed is compensated for by the pre-compression of the pick up springs 42c and 41c, so that the balls 42k and 41k and associated races cannot be caused to violently move from and into contact and, possibly, cause premature damage.

Figure 6:
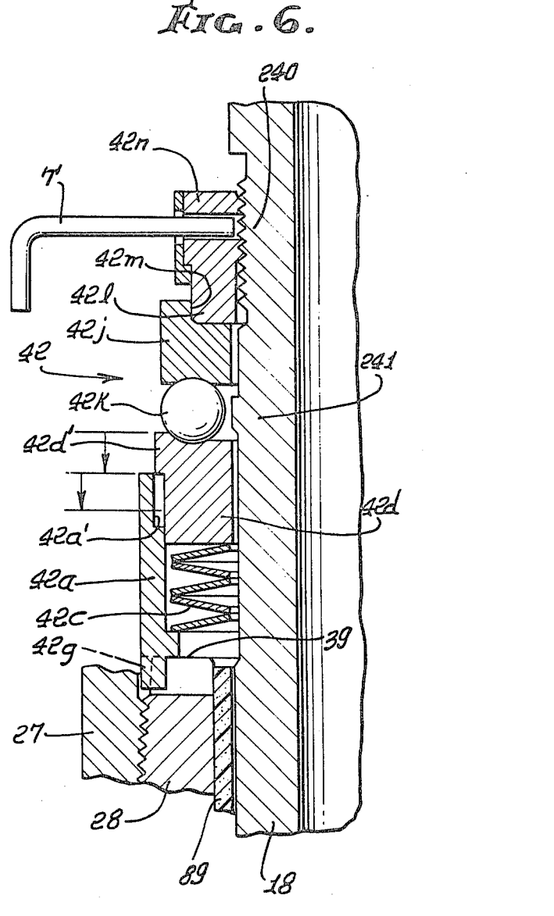
FIG. 6 is a fragmentary detail view illustrating an intermediate stage of assembly and adjustment.

Referring to FIGS. 6, 7, and 8, there is illustrated structure for enabling the pre-loading of the springs and the necessary motion. In FIG. 6, the bearing sub-assembly 42 is shown in a preliminary stage of assembly, with nut 42n threaded upwardly and the upper race 42j spaced upwardly from the concentric shaft section 241. As best seen in this view, the lower bearing race has an outwardly projecting enlargement 42d' adapted to move downwardly into an upper bore 42a' of the locking adaptor 42a. A suitable bar or tool T can be inserted into a hole in the nut 42k to effect threaded rotation of the nut downwardly. As indicated by the arrows, and seen in FIG. 7, when the nut is moved downwardly to a position at which the top of race 42d is flush with the top of the locking adaptor, the flange 42d' does not bottom in the bore 42a', but the springs 42c will be loaded, tending to bias the lower race 42d upwardly. When the housing is picked up, as indicated by the arrow, the springs cannot be flattened fully, since the flange 42d' engages the bottom of the bore 42a' and the downward thrust of the shaft is taken by the bearings 41 and 42. This would occur during circulation with the bit off bottom.

As seen in FIG. 8, when thrust is transmitted downwardly through the housing, as during drilling, the bearing 42, as well as the bearing 41, are only loaded by the springs tending to move the lower race upwardly. Thus, the pick up bearing means 41 and 42 are protected against running loose during the drilling operations. Adjustment of the set down bearing means 33, 34, 35 and 36 may also prevent looseness in the bearings during circulation off bottom. The pick up springs are preferably weaker than the set down springs, so that loading of the pick up springs cannot cause deflection of the set down springs.

ASSEMBLY PROCEDURE

In order to assemble the stacked bearing assembly described above, the drive shaft is suitably supported in an upright condition. The lowermost bearing sub-assembly 33 is first installed upon the shaft by successively lowering about the shaft the bearing races and balls 33a, 33e and 33g; the springs 33n and the thrust ring 33h can then be lowered about the shaft to rest upon the bearing race 33g. The split nut 34a can then be applied to the threads 136, and thereafter the bearing sub-assembly 34 lowered down about the shaft to rest upon the nut 34a. It will be noted that the weight of the components of the lowermost bearing sub-assembly 33, the spacer sleeve 33l below the bearing sub-assembly 34, as well as the thrust sleeve 34h of the sub-assembly 34 will inherently cause all of such components to be stacked one on the other without tolerance therebetween. However, the springs 34n of the bearing sub-assembly 34 may not be engaged beneath the downwardly facing shoulder 34o, dpending upon the position of the nut on the shaft. If clearance exists, it is only necessary to elevate the thrust sleeve 33l to allow access to the nut 34a, or insert a tool, such as the tool T through an opening TO in the sleeve, so that the nut can be adjusted on the shaft 18 and all clearance between the springs and the bearing components is eliminated. The fit between the nut and the off center shaft section and between the nut and the off center bore in the race 34a' and the concentric fit of said race with the shaft lock the race on the shaft for rotation as a unit.

Then, the components of the flow restrictor means 57 which are carried by the shaft, namely the split ring 86, the restrictor sleeve 81, and the snap ring 83 are installed on the shaft. As indicated above, the fit between the off center ring 86 and the sleeve 81 on the concentric shaft section on which the sleeve is mounted, locks the sleeve on the shaft for unitary rotation.

The thrust and flow restricting sleeve 37 and the upper set down bearings 35 and 36 are then assembled on the shaft, and the bearings adjusted and locked on the shaft to locate the adaptor ring 36h of the bearing 36 at the position shown in FIG. 2b, with all tolerance adjusted out of the respective bearings 35 and 36. The lower housing section 29, with the intermediate flow restrictor sleeve 89 therein, is then lowered over the shaft, so that the shoulder 31 in the housing seats on the locking adaptor 36h of the upper set down bearing, to transmit thrust downwardly, during drilling, through the thrust sleeves and rings of the respective bearings, to the springs of the bearing and thus to the bearing balls and the races on the shaft. Since each bearing is individually adjusted and has no tolerance, the load will be equally distributed to the stacked bearings.

The upper bearings or pick up bearing means 38 are then assembled over the shaft and individually adjusted, as previously described to pre-load the respective spring sets 42c and 41c to provide loading of the housing section 29 downwardly with respect to the shaft, against the springs of the set down bearing means. Here again, the off center fit between the adjustor nuts and the shaft and between the nuts and the upper bearing races, combine with the concentric fit of the races with the shaft, to lock the upper races to the shaft for rotation as a unit.

The upper flow restrictor sleeve 67 can then be assembled over the shaft onto the off center lock ring 71, so as to be rotatable with the shaft. The outer flow restrictor sleeve 58 is then set down over the inner sleeve and into keyed relation, at 59, with the upper thrust means 60.

Thereafter, the cap is threaded onto the upper end of the shaft and locked in place by the split lock ring 46 and the key 49, due to the combination of the eccentric and concentric surfaces previously described.

Thereupon, the upper housing section 24 can be assemblied, over the shaft, and threaded onto the upper pin 27 of the lower housing.

The location of the lower flow restrictor means 56 between the axially spaced set down bearings, 33 and 34 below the flow restrictor means, and 35 and 36 above the flow restrictor means, provides a rigid, well supported shaft section at the flow restrictor to resist bending when the bearings are adjusted to remove clearance. Such an arrangement protects the flow restrictor means from wear, to the extent that the radial contact between the sleeves 81 and 37 is minimized. The flow restrictor means 56 is, therefore, effective over a longer period of time to prevent excessive drilling fluid flow through the bearing housing, thereby maintaining adequate drilling fluid circulation through the bit for a longer period of time.

If and when, after long use, the bearings become worn to the extent that interfacial contact and progressive enlargement of the flow area through the primary flow restrictor means, the secondary flow restrictor sleeve 89 can continue to restrict fluid flow through the bearing housing as well as to provide secondary radial bearing support for the shaft.

From the foregoing, it will be apparent that the location of the primary flow restrictor means with respect to the adjustable bearings affords a durable, relatively long-lived bearing assembly of the motor fluid lubricated type, whereby excessive by-pass of drilling fluid through, the bearings is prevented for a substantial period of time. Thus, drilling operations may continue for a longer period of time, without removing the drill pipe, motor and bit form the hole, due to reduced drilling rate when cuttings are not flushed from the hole in an effective manner, or due to excessive heat at the bit causing bit failure.

We claim:

1. In a fluid driven drilling assembly, a fluid driven motor having a stator connectable to a drilling fluid conduit, a fluid driven rotor, a bearing assembly having a housing connected at one end to said stator to receive drilling fluid therefrom, a drive shaft in said housing and connected to said rotor to be driven rotatably thereby, said drive shaft having a fluid inlet for drilling fluid from said housing and a flow passage extending from said inlet through said drive shaft, bearing means between said housing and said shaft including thrust members to transmit thrust therebetween, and flow restrictor means between said shaft and said housing to limit the flow of fluid through said bearing means: the improvement wherein said bearing means includes a plurality of thrust bearings, said flow restrictor means being located between a pair of said thrust bearings, said housing having a single thrust transfer shoulder for loading said thrust bearings, and thrust transmitting means for distributing the load from said shoulder to said thrust bearings.

2. In a fluid driven assembly as defined in claim 1; each of said thrust bearings having a race axially shiftable in and rotatable with said housing, and a spring between said thrust transmitting means and said race.

3. In a fluid driven assembly as defined in claim 1; said flow restrictor means including a member rotatable with said shaft and a member non-rotatable in said housing said member in said housing being in thrust transfer relation with the adjacent thrust bearings.

4. In a fluid driven assembly as defined in claim 3; said flow restrictor means including additional members adjacent to said one end of said bearing housing and rotatable with said shaft and stationary in said housing and defining a restricted flow path.

5. In a fluid driven assembly as defined in claim 3; said flow restrictor means including additional members adjacent to said one end of said bearing housing and rotatable with said shaft and stationary in said housing and defining a restricted flow path, and also including secondary flow restricting means between said shaft and said bearing housing intermediate said first-mentioned members and said additional members and defining a restricted flow path at least as large in area as the path between said first-mentioned members and said additional members.

6. In a fluid driven assembly as defined in claim 3; said flow restrictor means including additional members adjacent to said one end of said bearing housing and rotatable with said shaft and stationary in said housing and defining an annular restricted flow path, and also including secondary flow restricting means between said shaft and said bearing housing intermediate first-mentioned members and said additional members and defining a restricted flow path at least as large in area as the path between said first-mentioned members and said additional members, said secondary flow restrictor means comprising a radial bearing between said shaft and said bearing housing.

7. In a fluid driven assembly as defined in claim 1; said thrust bearings having rolling bearings and races having angular contact with said rolling bearings for thrust and radial load transmission.

8. In a fluid driven assembly as defined in claim 1, 2, or 3, said thrust bearings being individually adjustable to remove clearance therefrom.

9. In a fluid driven assembly as defined in claim 1; said bearing means also including another thrust bearing having thrust members on said shaft and in said housing to transmit thrust from said shaft to said housing, and adjustor means for removing clearance from said thrust bearings.

10. In a fluid driven assembly as defined in claim 9; each of said thrust bearings having springs between said thrust members, said adjustor means for said another bearing assembly loading said springs in all of said bearing assemblies.

11. A bearing assembly comprising: a bearing housing, a drive shaft rotatable in said bearing housing and defining a fluid path therebetween from one end to the other end of said bearing housing; said drive shaft having a fluid inlet at said one end and an outlet at said other end; bearing means between said shaft and said bearing housing including bearing assemblies in thrust load transmission relationship with said drive shaft and said housing and including a plurality of said bearing assemblies spaced longitudinally of said bearing housing and drive shaft and each having thrust members on said shaft and in said bearing housing, flow restrictor means including members rotatable with said shaft and nonrotatable in said bearing housing between said bearing assemblies and defining a restricted flow path, adjustor means for removing clearance from said bearing assemblies, and means providing a single point of thrust transfer from said housing to all of said bearing assemblies.

12. In a fluid driven assembly as defined in claim 11; each of said bearing assemblies having springs between said thrust members.

13. In a fluid driven assembly as defined in claim 11; said bearing means also including another bearing assembly having thrust members on said shaft and in said housing to transmit thrust from said shaft to said housing, and adjustor means for removing clearance from said bearing assembly.

14. In a fluid driven assembly as defined in claim 13; each of said bearing assemblies having springs between said thrust members, said adjustor means for said another bearing assembly loading said springs in all of said bearing assemblies.

15. In a fluid driven assembly as defined in claim 11; said flow restrictor means including additional members adjacent to said one end of said bearing housing and rotatable with said shaft and stationary in said housing and defining a restricted flow path.

16. In a fluid driven assembly as defined in claim 11; said flow restrictor means including additional members adjacent to said one end of said bearing housing and rotatable with said shaft and stationary in said housing and defining a restricted flow path, and also including secondary flow restricting means between said shaft and said bearing housing intermediate said first-mentioned members and said additional members and defining a restricted flow path at least as large in area as the path between said first-mentioned members and said additional members.

17. In a fluid driven assembly as defined in claim 11; said flow restrictor means including additional members adjacent to said one end of said bearing housing and rotatable with said shaft and stationary in said housing and defining a restricted flow path, and also including secondary flow restricting means betwwen said shaft and said bearing housing intermediate said first-mentioned members and said additional members and defining a restricted flow path at least as large in area as the path between said first-mentioned members and said additional members, said secondary flow restrictor means comprising a radial bearing between said shaft and said bearing housing.

18. In a fluid driven assembly as defined in claim 11; said thrust members being interengaged with one another and with said housing, and one of said flow restrictor members being in thrust transfer relation with the thrust members of the bearing assemblies at opposite sides of said flow restrictor means.

19. In a fluid driven assembly as defined in claim 11; said bearing assemblies including bearing races and rolling bearings having angular contact.

20. A bearing assembly comprising: a shaft, a housing about said shaft, flow restrictor sleeves in said housing and on said shaft, thrust bearings between said shaft and said housing at opposite ends of said flow restrictor sleeves, a single thrust shoulder on said housing, and thrust transfer members engaged with said shoulder and each of said bearings to transfer thrust from said shoulder to each of said bearings.

21. A bearing assembly as defined in claim 20; one of said flow restrictor sleeves being in thrust transfer relation with said thrust transfer members.

22. A bearing assembly as defined in claim 20; one of said flow restrictor sleeves being in thrust transfer relation with said thrust transfer members, said bearings having angular contact races and rolling bearing elements.

23. A bearing assembly as defined in claim 20; one of said flow restrictor sleeves being in thrust transfer relation with said thrust transfer members, said bearings including members in said housing and on said shaft adjustable to eliminate clearance in said bearings.

24. A bearing assembly as defined in claim 20; one of said flow restrictor sleeves being in thrust transfer relation with said thrust transfer members, said bearings having angular contact races and rolling bearing elements, said bearings including members in said housing and on said shaft adjustable to eliminate clearance in said bearings.

* * * * *